(12) United States Patent  
Herbelin et al.

(10) Patent No.: US 8,965,368 B2  
(45) Date of Patent: Feb. 24, 2015

(54) METHOD FOR CHANGING A LOCATION AREA OF A TERMINAL

(75) Inventors: Philippe Herbelin, Vincennes (FR); Serban Purge, Paris (FR)

(73) Assignee: France Telecom, Paris (FR)

( * ) Notice: Subject to any disclaimer, the term of this patent is extended or adjusted under 35 U.S.C. 154(b) by 142 days.

(21) Appl. No.: 13/642,374

(22) PCT Filed: Apr. 19, 2011

(86) PCT No.: PCT/FR2011/050895
§ 371 (c)(1), (2), (4) Date: Nov. 7, 2012

(87) PCT Pub. No.: WO2011/131900
PCT Pub. Date: Oct. 27, 2011

(65) Prior Publication Data
US 2013/0053072 A1     Feb. 28, 2013

(30) Foreign Application Priority Data

Apr. 19, 2010 (FR) ...................................... 10 52961
Jun. 25, 2010 (FR) ...................................... 10 55124

(51) Int. Cl.
*H04W 4/00* (2009.01)
*H04W 24/00* (2009.01)
*H04W 60/00* (2009.01)

(52) U.S. Cl.
CPC .................................... *H04W 60/00* (2013.01)
USPC ................................... 455/435.1; 455/456.5

(58) Field of Classification Search
CPC ........ H04W 68/06; H04W 8/14; H04W 60/04
USPC ........................................... 455/435.1, 456.5
See application file for complete search history.

(56) References Cited

FOREIGN PATENT DOCUMENTS

| | | | |
|---|---|---|---|
| EP | 1292168 A2 | 3/2003 |
| GB | 2449228 A | 11/2008 |
| WO | 9511577 A1 | 4/1995 |
| WO | 0003557 A1 | 1/2000 |

OTHER PUBLICATIONS

International Preliminary Report on Patentability and English Translation of the Written Opinion dated Oct. 23, 2012 for corresponding International Application No. PCT/FR2011/050895, filed on Apr. 19, 2011.

(Continued)

*Primary Examiner* — Christopher M Brandt
(74) *Attorney, Agent, or Firm* — David D. Brush; Westerman, Champlin & Koehler, P.A.

(57) ABSTRACT

A method and apparatus are provided for changing a location area allocated to a current terminal attached to equipment belonging to a first location area of a communication network. The equipment furthermore belongs to at least one second location area of the communication network. The first area and the at least one second area are able to overlap one another. The method includes: broadcasting, via a broadcast channel, an identifier of the first location area and an additional location datum including at least one identifier of the at least one second location area; and selecting, for the current terminal, from the first and the at least one second location area, a current location area, according to the additional location datum and at least one predetermined selection parameter.

7 Claims, 4 Drawing Sheets

(56) References Cited

OTHER PUBLICATIONS

International Search Report and Written Opinion dated Aug. 30, 2011 for corresponding International Application No. PCT/FR2011/050895, filed Apr. 19, 2011.

Lon-Rong Hu et al., "An Adaptive Location Management Scheme for Global Personal Communications", 1995 Fourth IEEE International Conference on Universal Personal Communications Record. Gateway to the 21st Century. Tokyo, Nov. 6-10, 1995; IEEE International Conference on Universal Personal Communications, New York, IEEE, US LNKD—DOI:10.1109/, vol. CONF. 4, Nov. 6, 1995, pp. 950-954, XP010160680.

METHOD FOR CHANGING A LOCATION AREA OF A TERMINAL

CROSS-REFERENCE TO RELATED APPLICATIONS

This Application is a Section 371 National Stage Application of International Application No. PCT/FR2011/050895, filed Apr. 19, 2011, which is incorporated by reference in its entirety and published as WO 2011/131900 on Oct. 27, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure relates to the domain of the location of mobile communication terminals in mobile radio communication networks or fixed communication networks. More specifically, the disclosure has a particular application in the case where a terminal attached to an access network is capable of switching to standby mode and can support a procedure for updating its location in the network.

In a known manner, a location area of a communication network represents a geographical area in which a terminal can move without having to update its location in a regular manner in VLR ("Visitor Location Register") equipment belonging to the mobile communication network with which the terminal is registered.

A location area may include one or more cells which can, for example, be compliant with the GERAN ("GSM EDGE Radio Access Network")/UTRAN ("UMTS Terrestrial Radio Access Network") or eUTRAN (evolved UTRAN) standards. For example, a GERAN/UTRAN cell belongs to a single location area at a given time.

An identifier of the location area to which the cell belongs is broadcast to all of the terminals present in a cell using certain equipment belonging to the cell, such as a base station or an access node, via a dedicated transmission channel.

In the 3GPP R8 architecture, a tracking area of a mobile communication network comprises a geographical area in which a terminal can move without having to update its location in a Mobility Management Entity (MME) in the network, with which the terminal is registered.

A tracking list represents all of the tracking areas in which and between which a terminal can move without having to update its location in a regular manner in MME equipment.

Thus, a tracking list is associated with each terminal present in the tracking areas. All of the tracking areas in a tracking list are controlled by the same Mobility Management Entity MME equipment.

A tracking area may contain one or more eUTRAN cells. An eUTRAN cell belongs to a single tracking area at a given time. An identifier of the tracking area to which a cell belongs is broadcast in the cell via certain equipment which makes up this cell, such as a base station.

BACKGROUND OF THE DISCLOSURE

Prior techniques assume that the terminal can only belong to a single location area at a given time. As soon as a terminal switches to standby mode to reduce energy consumption and therefore save the battery, it identifies the location area where the change of state (the transition from an active operating mode to a standby mode) took place, referred to below as the initial location area.

In the known techniques, the terminal, despite being in standby mode, must inform a node of the network of its location area in a periodic manner or when it changes location area. To do this, a terminal in standby mode carries out a location update procedure. A location update procedure of this type is intended to inform a node of the network of the location area or tracking area in which the terminal is located in order to allow the network, if necessary, to transmit data to the terminal, such as a call, for example.

The location area update procedure consumes resources in the terminal, and more particularly electrical power, which has the effect of discharging the battery of the terminal more quickly (even though the standby mode is supposed to reduce consumption).

Thus, a need exists for a solution enabling reconfiguration of the location area of the terminal when the latter is in standby mode which is more economical with the resources of the terminal.

SUMMARY

An exemplary embodiment of the invention relates to a method for changing a location area allocated to a current terminal attached to equipment belonging to a first location area of a communication network, said equipment furthermore belonging to at least one second location area of said communication network, said first area and said at least one second area being able to overlap one another, characterized in that the method comprises the following steps implemented by said equipment:

a step of broadcasting, via a broadcast channel, an identifier of said first location area and an additional location datum including at least one identifier of said at least one second location area;

a step of selection, for said terminal, from the first and said at least one second location area, of a current location area, according to said additional location datum and at least one predetermined selection parameter;

a step of transmission of a control message to said current terminal including an identifier of said current location area.

Thus, the location area of the terminal can be changed in a circumstantial manner. Unlike the prior art techniques, the location area of a terminal is not changed purely on the basis of the identifier of the location area which is broadcast by the base stations distributed in the cells that make up the location area, but also on the basis of additional location data. This technique enables account to be taken of aspects other than only the location of the terminal in order to carry out a change of the location area, such as, for example, data transmission conditions within the network.

Thus, a solution of this type enables a reduction in the electrical consumption of the terminal by preventing the latter from being obliged to implement a location update procedure.

According to one particular embodiment, said additional datum varies over time.

Thus, the additional location datum is adapted to circumstances.

According to a particular characteristic, the said at least one predetermined selection parameter is a function of said communication terminal and belongs to the group including:

a standby duration of said terminal;
a charge level of the battery of said terminal;

a movement speed of said terminal;

a movement trajectory of said terminal;

a type of said terminal.

Thus, unlike prior techniques, the change of the location area can be managed according to parameters inherent in the terminal in order to enable optimum adaptation of the location area to the terminal. Thus, for example, when the terminal has been in standby mode (i.e. inactive) for a predetermined period, an embodiment of the invention enables the selection of a location area which is different from the current location area of the terminal. Similarly, when the charge level of the battery of the terminal reaches a predetermined threshold (for example 30%), an embodiment of the invention enables the selection of a location area which is different from the current location area of the terminal so that the terminal does not need to implement a location area update procedure. Conversely, when the charge level of the battery of the terminal reaches a predetermined ceiling (for example 70%), an embodiment of the invention enables the selection of a location area which is geographically or logically more precise than the current location area of the terminal so that the terminal can be located in a more precise manner prior to a paging procedure.

According to a different embodiment, when the terminal, despite being in standby mode, has already carried out a plurality of location update procedures, the location area can be changed in order to take account of the trajectory or speed of the terminal.

According to a different embodiment, the preceding parameters can be combined in order to take account of complex situations.

According to a particular characteristic, said at least one predetermined selection parameter is a function of said communication network and belongs to the group including:

a time of day;

a load level of the equipment that makes up the communication network;

a type of equipment having effected the transition to standby mode of the terminal.

Thus, unlike prior techniques, the change of the location area can be managed according to parameters inherent in the network in order to enable optimum adaptation of the location area to the situation of the network. Thus, for example, when the load of the network (i.e. the number of calls made or received in one or more location areas of the network) is high or, on the contrary, low, it is possible to add, remove or update the additional location data which are transmitted.

According to a different embodiment, the location area can be changed according to time parameters, such as, for example, a time of day.

According to a particular embodiment, said selection step is implemented by said communication network during a procedure for searching for said terminal by said communication network.

According to a particular characteristic, said additional location datum includes a hierarchical ordering of location areas of said communication network.

This hierarchical ordering can be geographical or logical.

According to a different aspect, an embodiment of the invention also relates to a device for changing a location area allocated to a current terminal attached to equipment belonging to a first location area of a communication network, said equipment furthermore belonging to at least one second location area of said communication network, said first area and said at least one second area being able to overlap one another, characterized in that the device includes the following means implemented by said equipment:

means for broadcasting, via a broadcast channel, of an identifier of said first location area and an additional location datum including at least one identifier of said at least one second location area;

means for selection, for said terminal, from the first and said at least one second location area, of a current location area, according to said additional location datum and at least one predetermined selection parameter;

means for transmission of a control message to said current terminal including an identifier of said current location area.

According to a different aspect, an embodiment of the invention also relates to a computer program product downloadable from a communication network and/or stored on a computer-readable and/or microprocessor-executable medium, and including program code instructions for the execution of the change method as previously described.

According to a different aspect, an embodiment of the invention also relates to equipment belonging to a first location area of a communication network and to which a current terminal is attached, said equipment furthermore belonging to at least one second location area of said communication network, said first area and said at least one second area being able to overlap one another, characterized in that the equipment includes:

means for broadcasting, via a broadcast channel, an identifier of said first location area and an additional location datum including at least one identifier of said at least one second location area;

means for selection, for said terminal, from the first and said at least one second location area, of a current location area, according to said additional location datum and at least one predetermined selection parameter;

means for transmission of a control message to said current terminal including an identifier of said current location area.

An embodiment of the invention relates to a method for changing a location area of a terminal attached to equipment belonging to at least a first and a second location area of a communication network, the first location area and the second location area being able to overlap one another, the method including the following steps implemented by the equipment:

broadcasting on a common broadcast channel of a message including identifiers of the first and second location area, determination, from the first and second location area, of a current location area to be used for the terminal, transmission of a control message to the terminal including an identifier of the current location area.

An embodiment of the invention proposes to determine a current location area of a terminal in standby mode from a set of location areas according to selection parameters as previously described.

It is then possible, notably when the traffic in the network is reduced, to choose a location area associated with the terminal with a greater surface area, for example, in order to reduce the number of location area update procedures of the terminal.

The reduction in the number of update procedures allows the costs of the network equipment responsible for these procedures to be reduced by reducing the capacity of the machines and/or by reducing the energy consumption.

This also allows the electrical energy consumption of the terminals to be reduced following the reduction in the number of location area updates.

According to one characteristic of the change method forming the subject-matter of an embodiment of the invention, the control message is transmitted during a terminal paging procedure.

According to a characteristic of the change method forming the subject-matter of an embodiment of the invention, the control message is transmitted in response to a location update message transmitted by the terminal.

BRIEF DESCRIPTION OF THE DRAWINGS

Other characteristics and advantages will become evident from a reading of embodiments described with reference to the drawings, in which.

DETAILED DESCRIPTION OF ILLUSTRATIVE EMBODIMENTS

1. General Principle of an Embodiment of the Invention

An embodiment of the invention reduces the number of location updates of a terminal vis-à-vis the network equipment which is responsible for storing the location area of the terminal. These location updates of a terminal are necessary in order to allow the execution of a paging procedure in the event of an incoming call to the terminal. However, they consume resources.

In order to reduce the number of location updates, the general principle of an embodiment of the invention consists in supplying the terminal, not only with an identifier of the location area to which it is currently attached, referred to as the current location area, but also with an additional location datum.

More specifically, in one embodiment, the additional location datum includes an identifier of at least one other location area consisting, for example, in a group of location areas which groups one or more location areas, including the current location area. A location area consisting, for example, in a group of location areas which groups one or more location areas is referred to as a master location area.

In an additional embodiment, in addition to a master area identifier, the identification datum may furthermore, and in a recursive manner, include an identifier of a location area of a higher order than the master location area, referred to as a super master area, which is made up of a group of master location areas.

The grouping of location areas can be continued in a recursive manner until, for example, a global location area corresponding to all of the location areas of a region or country is defined. The important aspect in the context of the present disclosure is that the normal transmission of the current location area identifier in which the terminal is located is accompanied by the supply of an additional location datum including an identifier of at least one other location area.

An embodiment of the invention introduces a hierarchical ordering of the location areas. A portion of this hierarchy is transmitted to the communication terminal in the form of the additional location datum. The location areas are hierarchically ordered either according to their size, in the manner of Russian dolls, to take account of the geography of a city or a country, for example a first location area may cover a house, this first area is included in a second location area which covers a district, this second location area in turn being able to be included in a third location area which covers a city included in a fourth location area which covers a region, etc.; or in a logical manner, for example, according to the topology of the places in the case of location areas which are, for example, contiguous or juxtaposed.

Figure 1:
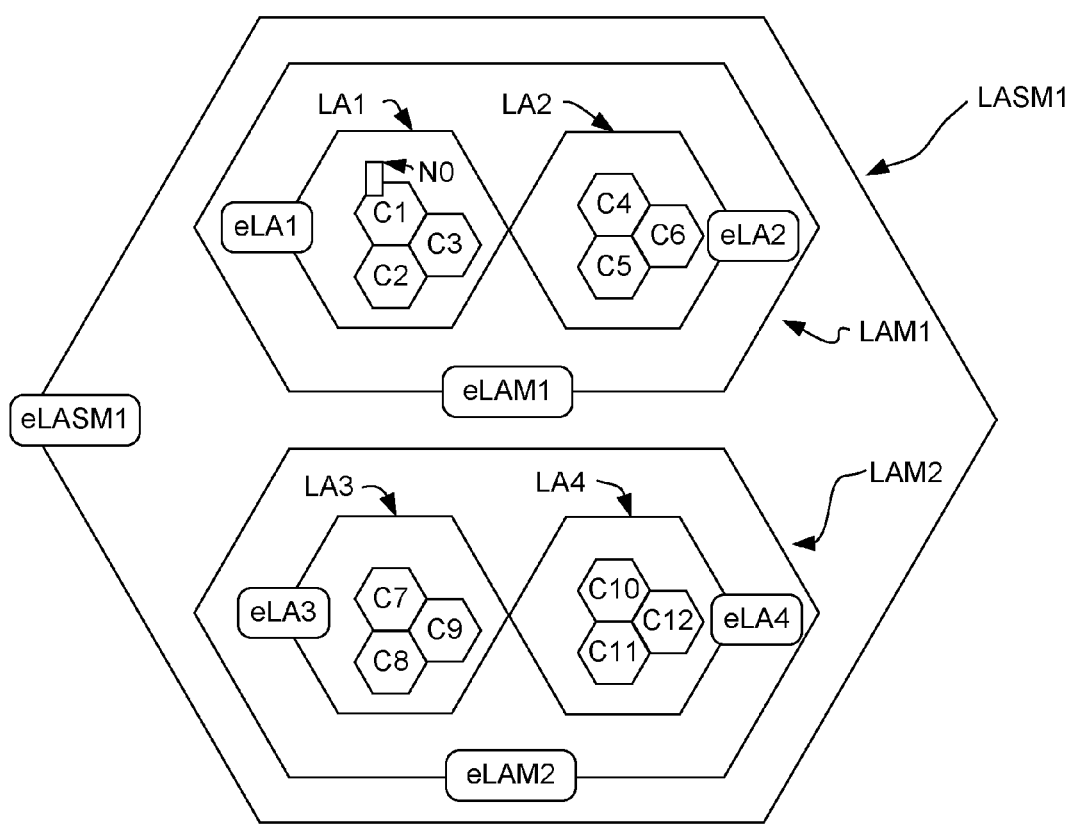
FIG. 1 shows the grouping of the location areas.

FIG. 1 shows in a schematic manner the way in which the location areas are grouped. In FIG. 1, the location areas are denoted "LAx", the master location areas are denoted "LAMx" and the super master location area is denoted "LASM1". The location areas LAx include cells, denoted Cx. In the description of FIG. 1, "x" is used to designate any given reference. For example, the location area LA1 includes the cells C1, C2 and C3. Each cell is managed by at least one piece of equipment (for example a base station, not shown).

A location area LAx is made up of adjacent cells which may or may not overlap one another. The location areas LAx are unique and are designated by a number or any other identification system.

A master location area LAMx groups one or more location areas LAx. It is unique and is designated by a number or any other identification system.

A super master location area LASMx groups one or more master location areas LAMx. It is unique and is designated by a number or any other identification system.

Within the network, equipment responsible for managing the location area (referred to as equipment eLAx, for example eLA1 for the area LA1) is responsible for transmitting information, such as the location area which the terminal must consider when the latter switches to standby mode, to the terminal N0, such as, for example, the location area which the terminal will have to consider when the latter switches from connected mode to standby mode to reduce the consumption of the battery. The terminal N0 may be a mobile or fixed terminal which can be configured in standby mode. The configuration of a terminal which switches to standby mode, within the scope of an embodiment of the invention, consists in taking account of the location area in which it is located. Other operations are also implemented during the transition to standby mode, but they do not fall within the scope of an embodiment of the invention: such operations include, for example, turning off the terminal screen.

This configuration operation of the transition to standby mode is implemented when the terminal N0 is connected to a cell C1, for example, belonging to the location area LA1. During this configuration, the terminal N0 is informed that it is located in the location area LA1 identified by a location area number, for example LA1, as shown in FIG. 1.

Equipment eLAx designates equipment responsible for managing a location area LAx.

Equipment eLAMx designates equipment responsible for managing a master location area LAMx.

Equipment eLASMx designates equipment responsible for managing a super master location area LASMx.

When the terminal N0 switches from connected (active) mode to standby mode, it knows its last location area (LA1 in our example). In order that network equipment can transmit an incoming call to the terminal N0, the terminal N0 must periodically listen to a broadcast channel, such as, for example, a paging channel inherent in each cell. Via this paging channel or a broadcast channel, the terminal N0 receives information such as the identifier of the last location area and the additional location datum.

When the terminal N0 identifies that it is changing location area, it informs network equipment, such as, for example the equipment eLA2, of its new location area.

When the terminal N0 is configured in standby mode, it periodically informs network equipment, such as, for example, the equipment eLA2, of the identity of its current location area even if the latter has not changed. This allows the network to make sure that the terminal N0 is not switched off, and to update the information linked to the terminal in the network, such as the current location area and the last cell to which the terminal connected.

Within the scope of an embodiment of the invention, each cell broadcasts location area information which includes not only the identifier of the location area to which the cell belongs, but also the identifier of the master location area LA Master and the identifier of the super master location area LA Super Master. For example, the cell C1 transmits a message including not only the identifier of the location area LA1, but also the identifiers of the following location areas: LAM1 and LASM1. According to an embodiment of the invention, these two identifiers make up the additional location data supplied in addition to the identifier of the location area.

All this information is received by the terminal N0 via the equipment responsible for the cells of the location area in which it is located, such as base stations, for example.

For all the procedures described below, the decisions taken by the network equipment (equipment eLAx, equipment eLAMx and equipment eLASMx) to change the location area of a terminal N0 in standby mode are taken according to parameters associated with the terminal N0, such as:
 the duration of the standby mode,
 the movement speed of the terminal,
 the trajectory of the terminal during its movement,
 the type of terminal N0,
 the operating history of the terminal N0,
 or any other relevant parameter linked to the terminal N0.
And/or according to parameters of network equipment, such as:
 time (night/day),
 type of node which has effected the transition to standby mode of the terminal N0,
 or any other relevant parameter linked to the network equipment.

According to a first update method, the procedure for changing the current location area of the terminal N0 is instigated during the registration of the terminal N0 with one of the pieces of management equipment of a location area. In this case, the change procedure is implemented according to one of the following three possibilities:

By the equipment eLAx responsible for the location area LAx. The terminal N0 belongs to the location area LAx. During the registration of the current location area of the terminal N0 with the equipment eLAx responsible for the location area LAx, the equipment eLAx informs the terminal that its attachment location area has changed and it becomes LAMx.

By the equipment eLAMx responsible for the master location area LAMx: The terminal N0 belongs to the location area LAMx. During the registration of the current location area of the terminal N0 with the equipment eLAMx responsible for the location area LAMx, the equipment eLAMx informs the terminal that its attachment location area has changed and it becomes LASMx.

By the equipment eLASMx responsible for the super master location area LASMx: The terminal N0 belongs to the super master location area LASMx. During the registration of the current location area of the terminal N0 with the equipment eLASMx responsible for the super master location area LASMx, the equipment eLASMx informs the terminal that its attachment location area has changed and it becomes LAMx or LAx (this case corresponds to a change of the location area to make it more precise).

It is possible for the same equipment to be responsible for different location areas. For example, the equipment eLASMx is responsible for the location area LASMx but also for the location area LAMx. The configuration of the network responsible for the location areas is independent of the topology/configuration of these location areas.

According to a second update method, the procedure for changing the current location area of the terminal N0 is instigated at the initiative of the network. This embodiment includes a step of transmission of a message (for example a paging message) to the terminal N0 by one of the pieces of equipment responsible for a location area. The transmission of this message is implemented from the equipment eLAx, the equipment eLAMx or the equipment eLASMx respectively responsible for the corresponding location area (LAx, LAMx, LASMx) via a cell belonging to the current location area of the terminal N0 to inform it that it must implement a location update procedure.

Following the reception of this message, the actual change of the location area of the terminal is implemented by carrying out the steps of the method as previously described.

In this embodiment, there is only one general location update procedure, but this method is instigated in two different ways.

A particular embodiment of the invention is described below. It is clearly understood that the embodiment which is described is in no way limiting and the use by the terminal of the additional datum which is supplied by the network can be carried out according to protocols other than those described in this embodiment.

2. Description of an Embodiment

The embodiment described below is implemented in a network based on an architecture which includes a location area LA managed by equipment eLA referred to as an "Ultra Flat Architecture Gateway" UFA_GW and a location area LAM1 managed by equipment eLAM referred to as S-CSCF ("Serving-Call Session Control Function").

Figure 2:
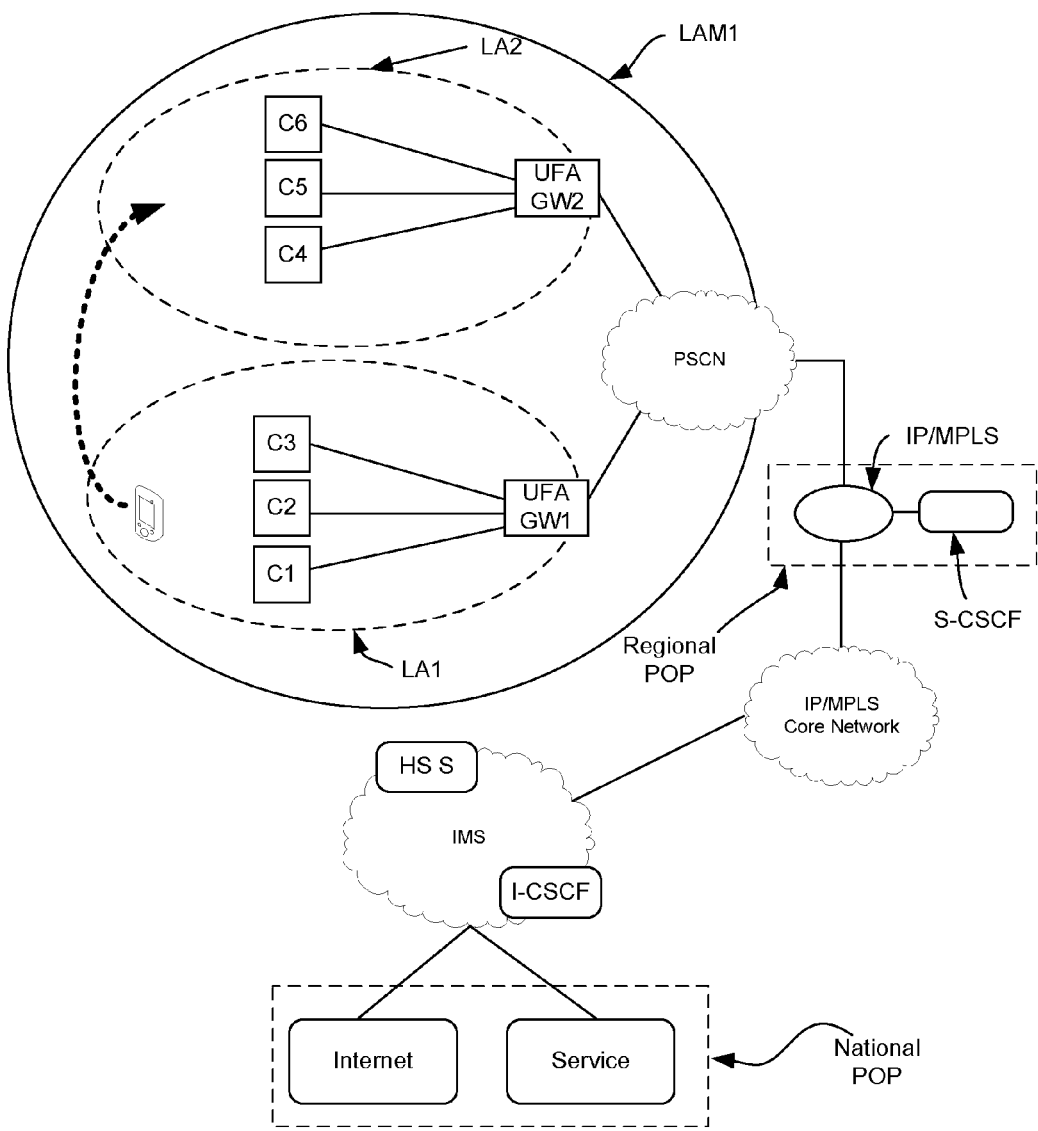
FIG. 2 shows a first embodiment of the invention.
Figure 3:
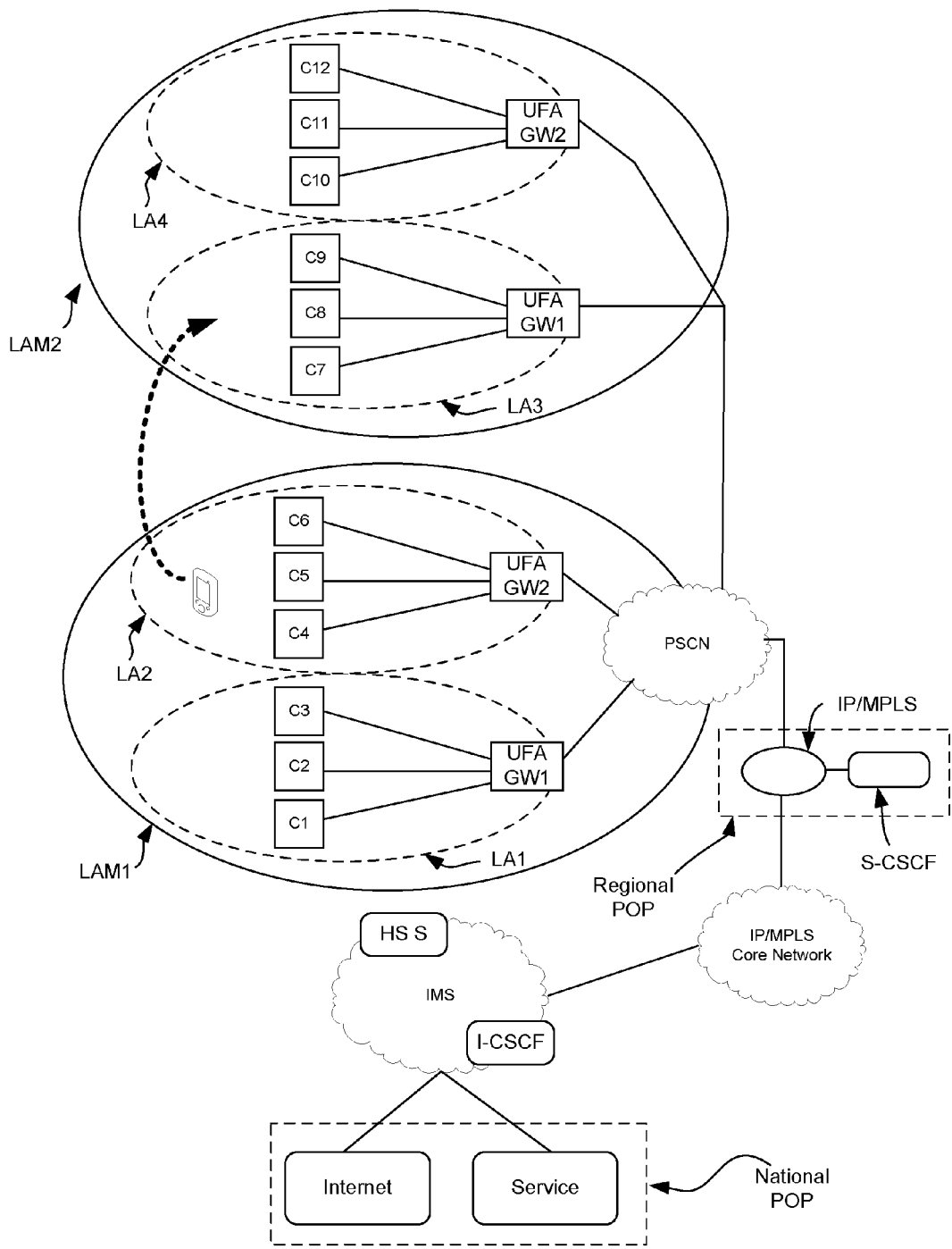
FIG. 3 shows a second embodiment of the invention.

An architecture of this type is shown in FIG. 2 and in FIG. 3. This architecture forms part of a more global architecture such as an IMS ("IP Multimedia Subsystem") architecture including SIP ("Session Initiation Protocol") servers. In the IMS architecture, the S-CSCF equipment manages exchanges of messages for the establishment of application sessions. The S-CSCF equipment is a proxy SIP which also implements session control functions.

Within this UFA architecture, a terminal N0 is connected to the gateway UFA_GW1 in order to access the Internet service or any other service of the network-managing operator. The gateway UFA_GW1 transmits messages to the terminal N0 in accordance with a signaling protocol, for example: RRC ("Radio Resource Control") enabling the configuration of the radio parameters of which the location area identifier forms part. At the end of an inactivity time, the terminal N0, before switching to standby mode, informs the gateway UFA_GW1 of its change of state.

In response to the terminal N0 which informs the gateway UFA_GW1 of its transition to standby mode, the gateway UFA_GW1 transmits the identifier of the location area which the terminal N0 must consider as being its location area, for example LA1.

Within the scope of an embodiment of the invention, the gateway UFA_GW1 transmits the following message into all of the cells belonging to the location area LA1, on the paging channel of each cell.

A message of this type includes the "cell x" identifiers of the current cell of the terminal, LA1 of the current location area to which the cell belongs and LAM1 of the master location area to which the current location area LA1 belongs.

The identifiers "LA1" and "LAM1" make up the additional location data within the meaning of an embodiment of the invention.

The terminal N0, while it is located in the location area LA1, receives information from each cell included in the location area LA1.

The terminal N0 therefore regards the location area LA1 as its current location area. When the terminal N0 carries out a location update procedure when it changes location area, for example by moving from the location area LA1 to the location area LA2, it receives a message via the paging channel or the broadcast channel of a cell of the location area LA2 which contains:

the "cell x" identifiers of the current cell of the terminal,
LA2 of the location area LA2 to which the cell belongs, and
LAM1 of the master location area to which the location area LA2 belongs.

According to the parameters managed by the gateway UFA_GW1 (time, type of node which has effected the transition to standby mode, etc.), the gateway UFA_GW1 decides, in this embodiment, that the most appropriate location area for the terminal N0 is no longer the location area LA1, but the master location area LAM1.

The gateway UFA_GW1 carries out the update procedure, including the following steps:

a step of instigating a procedure of paging the terminal N0 within the location area LA1 so that the terminal N0 switches from standby mode to connected (active) mode vis-à-vis the gateway UFA_GW1;

a step of transmission by the gateway UFA_GW1 of a message to the terminal N0 to inform it that the location area to be considered is no longer the location area LA1, but the master location area LAM1. This message includes the list of location areas and points towards the master location area LAM1;

a step of transmission by the gateway UFA_GW1 to the equipment S-CSCF of a message to inform it of the change of current location area of the terminal N0. In the case of an incoming call for the terminal N0, the paging procedure will be able to be instigated by the equipment S-CSCF or the gateway UFA_GW1;

a step of transmission by the gateway UFA_GW1 to the terminal N0 of an instruction to switch to standby mode;

a step of change of operating mode from connected mode to standby mode by the terminal N0. The terminal NO carries out a supervision of the paging channel of each cell of the location area LAM1 by now considering that the master location area LMA1 is the current location area of the terminal N0.

The terminal therefore no longer implements the update of its location area, even if it moves from the location area LA1 to the location area LA2 since the location area LA1 and the location area LA2 belong to the current master location area LAM1 in which the terminal capital N0 is located.

Compared with the preceding example where the terminal N0 would consider the location area LA1 as the current location area of the terminal N0, the terminal N0 now considers the master location area LAM1 as the new current location area. When the terminal N0 leaves the location area LA1 to move into the location area LA2, it receives the "cell x" identifiers of the current cell of the terminal, LA2 of the location area LA2 to which the cell belongs and LAM1 of the master location area to which the location area LA2 belongs.

However, since the current location area of the terminal N0 is the location area LAM1 which includes the location area LA1 and the location area LA2, the terminal N0 does not carry out the location area update procedure.

The location area update procedure is instigated by the terminal N0 when it receives the "cell x" identifiers of the current cell of the terminal, LA3 of the location area LA3 to which the cell belongs and LAM2 of the master location area to which the location area LA3 belongs via the paging channel of the cell of the location area LA3.

In a different embodiment of the invention, instead of the gateway UFA_GW1 instigating a paging procedure to inform the terminal N0 of the change of its current location area, the gateway UFA_GW1 can also wait until the terminal N0 carries out a re-registration procedure with the network to ensure its presence. The gateway UFA_GW1 then carries out the update procedure by implementing the following steps:

a step of reception of a request for registration of the terminal N0 with the equipment responsible for the location area LA1 so that the terminal N0 ensures its presence in the area;

a step of transmission by the gateway UFA_GW1 of a message to the terminal N0 to inform it that the location area to be considered is no longer the location area LA1, but the master location area LAM1;

a step of transmission by the gateway UFA_GW1 of the message to the equipment S-CSCF to inform it of the change of location area of the terminal N0. In the case of an incoming call for the terminal N0, the paging procedure can be instigated by the equipment S-CSCF or the gateway UFA_GW1;

a step of transmission by the gateway UFA_GW1 to the terminal N0 of an instruction to switch to standby mode;

a step of change of operating mode from connected mode to standby mode by the terminal N0. The terminal N0 carries out a supervision of the paging channel of each cell of the location area LAM1 by now considering that the master location area LAM1 is the current location area of the terminal N0.

The update procedures as described allow a change of the current location area of the terminal N0 to be carried out in an increasing manner from the location area LA1 to the location area LAM1, but in a decreasing manner from the location area LAM1 to the location area LA1.

In the context of the present disclosure, it is important to note that the proposed procedure is two-way. This means that the procedure allows the location area of the terminal to be increased (by supplying an identifier of a geographically or logically larger location area) or to be reduced (by supplying an identifier of a geographically or logically smaller location area).

For example, when the terminal or equipment responsible for the current location area of the terminal notes that it is after 10 pm, it can decide to extend its location area. To do this, prior to its switch to standby, it will carry out a location update procedure during which it indicates to the communication network that the location area is henceforth the master location area LAMx, the location area which, in addition to the initial location area LAx in which the terminal is located, groups, for example, two or three other location areas. Thus, if the network must transmit a datum while the terminal is on standby, it carries out a paging procedure on all of the cells which make up the master location area LAMx. An example such as this is particularly suitable during night times (10 pm-6 am), times during which the communication network is under little load, and therefore during which paging procedures can be instigated on a larger scale (over a plurality of location areas simultaneously) without disrupting the operation of the communication network.

Conversely, when the terminal or equipment responsible for the current location area of the terminal notes that it is after 6 am, it can decide to reduce its location area. To do this, it will carry out a location update procedure in which it indicates to equipment of the communication network that the current location area of the terminal is henceforth the location area LAx.

3. Update at the Initiative of the Terminal

In a specific embodiment of the invention, the terminal instigates the change of the current location area to which it belongs. This embodiment is particularly well-suited when the terminal plays a proactive role in the communication network. One of the disadvantages of current communication networks is the fact that they are built on a decision-making centralization principle, which, on the one hand, entails the implementation of extremely expensive and powerful hardware in what is called the "network core". In current architectures, it was considered that the network should take decisions relating to the terminals. In this specific embodiment, it is proposed that the terminal can, at least in some cases, instigate the change of the current location area by deciding for itself on the location area in which it registers.

In this embodiment, the location change procedure includes the following steps:

a step of broadcasting, by equipment responsible for managing the current location area of the terminal and via a broadcast channel, of an identifier of the current location area and of one or more identifiers of the master or super master location area;

a step of selection, by the terminal, from the transmitted identifiers of the location area, of a new location area according to at least one selection parameter predetermined by the terminal;

a step of reception of a request for registration of the terminal with the equipment responsible for the location area. This request includes the identifier of the location area chosen by the terminal from the identifiers transmitted on the broadcast channel;

a step of transmission, from the equipment responsible for the location area, to the terminal of a message informing the terminal that the new location area selected by the terminal has been taken into account.

In a complementary manner, in order not to disrupt the operation of the communication network, the equipment responsible for the location area can also transmit a message to the terminal informing it that the location area selected by the terminal has not been taken into account, while transmitting to it the identifier of the location area which the terminal must use.

The equipment responsible for the location area then informs the other equipment of the new location area of the terminal (which is either the area selected by the terminal or the area imposed by the equipment responsible).

The predetermined selection parameters to which the terminal refers are, for example:
the duration of the standby mode,
the movement speed of the terminal,
the trajectory of the terminal during its movement,
the type of terminal,
the operating history of the terminal,
or any other relevant parameter linked to the terminal,
time (night/day),
the battery charge of the terminal.

Thus, the terminal can take into consideration parameters not necessarily known by the network. This typically involves the terminal battery charge. The terminal can increase the battery charge duration by itself selecting a location area which is geographically or logically more extended than the current location area in which it is registered. In this embodiment, the terminal does not need data other than the data already transported by the network in relation to the invention: the presence of additional location data (in the form of master and super master area identifiers) suffices. The terminal then uses a registration request as defined in the implemented standard.

4. Terminal and Equipment Responsible

Figure 4:
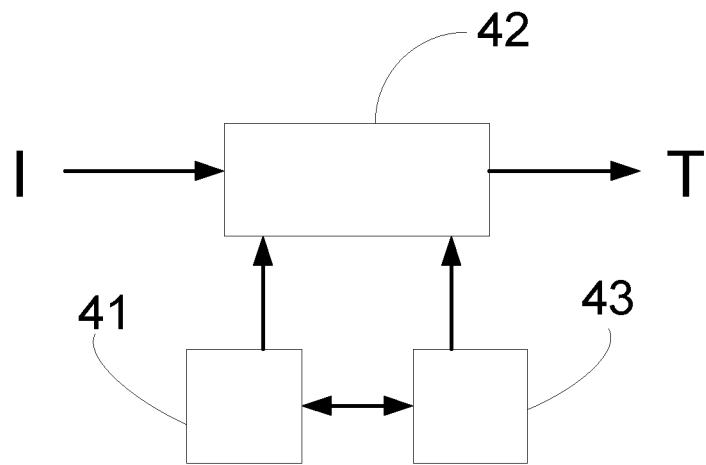
FIG. 4 describes a terminal according to an embodiment of the invention.

An embodiment of a communication terminal according to the invention is presented with reference to FIG. 4.

A terminal of this type includes a memory 41 made up of a buffer memory, a processing unit 42, equipped, for example, with a microprocessor P, and controlled by the computer program 43, implementing the change method according to an embodiment of the invention.

On initialization, the code instructions of the computer program 43 are, for example, loaded into a RAM memory before being executed by the processor of the processing unit 42. The processing unit 42 receives at its input at least one information element I, such as identifiers of location areas. The microprocessor of the processing unit 42 implements the steps of the change method previously described, according to the instructions of the computer program 43, to deliver a processed information element T, such as the identifier of the location area selected by or for the terminal, from the received identifiers. To do this, the terminal includes, as well as the buffer memory 41, means for receiving, via a broadcast channel, an identifier of the first location area and an additional location datum including at least one identifier of at least one second location area and means for selection, from the first and said at least one second location area, of a current location area, according to the additional location datum and at least one predetermined selection parameter. These means are controlled by the microprocessor of the processing unit 42.

Figure 5:
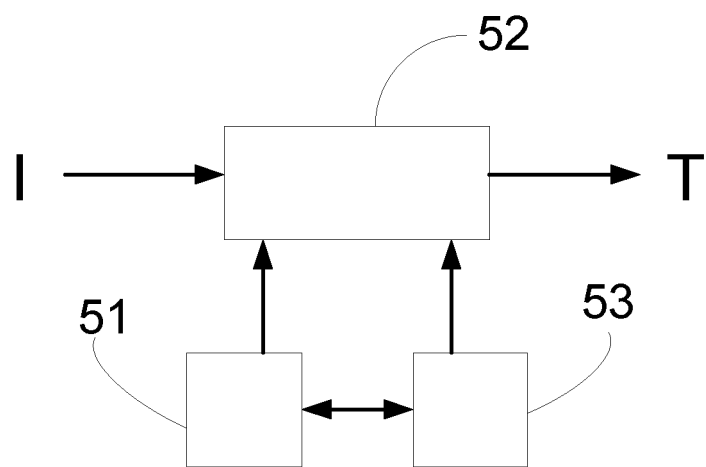
FIG. 5 describes a device for changing a location area according to an embodiment of the invention.

An embodiment of a change device is presented with reference to FIG. 5. A device such as this can be equipment responsible for a location area, a gateway in a "UFA" architecture, as previously described.

A device of this type includes a memory 51 made up of a buffer memory, a processing unit 52, equipped, for example, with a microprocessor P, and controlled by the computer program 53, implementing the change method according to an embodiment of the invention.

On initialization, the code instructions of the computer program 53 are, for example, loaded into a RAM memory before being executed by the processor of the processing unit 52. The processing unit 52 receives at its input at least one information element I, such as a registration request originating from a terminal. The microprocessor of the processing unit 52 implements the steps of the change method previously described, according to the instructions of the computer program 53, to deliver a processed information element T, such as the identifier of the location area selected by the device for a given terminal. To do this, the device includes, as well as the buffer memory 51, means for broadcasting, via a broadcast channel, an identifier of the first location area and an additional location datum including at least one identifier of at least one second location area and means for selection, from the first and said at least one second location area, of a current location area, according to the additional location datum and at least one predetermined selection parameter. These means are controlled by the microprocessor of the processing unit 52.

Although the present disclosure has been described with reference to one or more examples, workers skilled in the art will recognize that changes may be made in form and detail without departing from the scope of the disclosure and/or the appended claims.

The invention claimed is:

1. A method for changing a location area allocated to a current terminal attached to equipment belonging to a first location area of a communication network, said equipment furthermore belonging to at least one second location area of said communication network, said first area and said at least one second area being able to overlap one another, wherein the method comprises the following steps implemented by said equipment:
- a step of broadcasting, via a broadcast channel, an identifier of said first location area and an additional location datum including at least one identifier of said at least one second location area;
- a step of selection, for said current terminal, from the first and said at least one second location area, of a current location area, according to said additional location datum and at least one predetermined selection parameter, which is a function of said communication network and not of said current terminal and belongs to the group consisting of:
  - a time of day;
  - a load level of the equipment that makes up the communication network; and
  - a type of said equipment having effected a transition to standby mode of the current terminal; and
- a step of transmission of a control message to said current terminal including an identifier of said current location area.

2. The method as claimed in claim 1, wherein said additional location datum varies over time.

3. The method as claimed in claim 1, wherein said selection step is implemented by said equipment during a procedure for searching for said terminal by said communication network.

4. The method as claimed in claim 1, wherein that said additional location datum includes a hierarchical ordering of location areas of said communication network.

5. A device for changing a location area allocated to a current terminal attached to equipment belonging to a first location area of a communication network, said equipment furthermore belonging to at least one second location area of said communication network, said first area and said at least one second area being able to overlap one another, wherein the device includes:
- means for broadcasting, via a broadcast channel, an identifier of said first location area and an additional location datum including at least one identifier of said at least one second location area;
- means for selection, for said current terminal, from the first and said at least one second location area, of a current location area, according to said additional location datum and at least one predetermined selection parameter, which is a function of said communication network and not of said current terminal and belongs to the group consisting of:
  - a time of day;
  - a load level of the equipment that makes up the communication network; and
  - a type of equipment having effected a transition to standby mode of the current terminal; and
- means for transmission of a control message to said current terminal including an identifier of said current location area.

6. A non-transitory computer-readable medium comprising a computer program stored thereon and including program code instructions for implementing a method of changing a location area allocated to a current terminal, when this program is executed by a processor, wherein the current terminal is attached to equipment belonging to a first location area of a communication network, said equipment furthermore belonging to at least one second location area of said communication network, said first area and said at least one second area being able to overlap one another, wherein the instructions comprise:
- instructions configured to cause the equipment to broadcast, via a broadcast channel, an identifier of said first location area and an additional location datum including at least one identifier of said at least one second location area;
- instructions configured to cause the equipment to select, for said current terminal, from the first and said at least one second location area, a current location area, according to said additional location datum and at least one predetermined selection parameter, which is a function of said communication network and not of said current terminal and belongs to the group consisting of:
  - a time of day;
  - a load level of the equipment that makes up the communication network; and
  - a type of said equipment having effected a transition to standby mode of the current terminal; and
- instructions configured to cause the equipment to transmit a control message to said current terminal including an identifier of said current location area.

7. Equipment belonging to a first location area of a communication network and to which a current terminal is attached, said equipment furthermore belonging to at least one second location area of said communication network, said first area and said at least one second area being able to overlap one another, wherein the equipment includes:
- means for broadcasting, via a broadcast channel, an identifier of said first location area and an additional location datum including at least one identifier of said at least one second location area;
- means for selection, for said current terminal, from the first and said at least one second location area, of a current location area, according to said additional location datum and at least one predetermined selection parameter, which is a function of said communication network and not of said current terminal and belongs to the group consisting of:
  - a time of day;
  - a load level of the equipment that makes up the communication network; and
  - a type of said equipment having effected a transition to standby mode of the current terminal; and
- means for transmission of a control message to said current terminal including an identifier of said current location area.

* * * * *